April 3, 1934.  W. P. F. FANGHANEL ET AL  1,953,850
FILLING AND STUFFING MACHINE FOR MATTRESSES AND THE LIKE
Filed Oct. 28, 1932
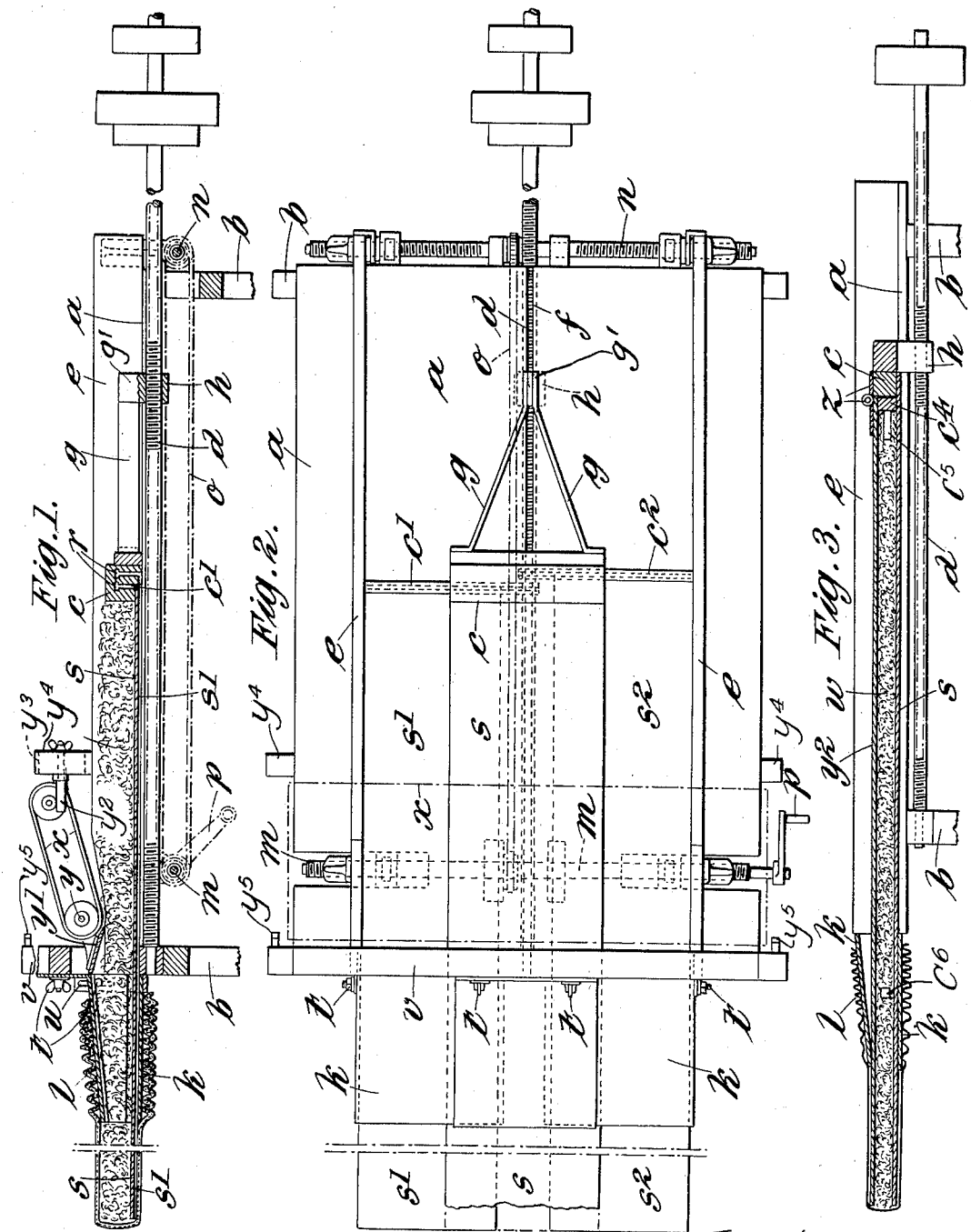

Patented Apr. 3, 1934

1,953,850

UNITED STATES PATENT OFFICE 1,953,850

FILLING AND STUFFING MACHINE FOR MATTRESSES AND THE LIKE

Walter Paul Frederick Fanghanel, London, and Alfred Sydney George Rolstone, Plumstead, Kent, England Application October 28, 1932, Serial No. 640,094
In Great Britain January 1, 1932

6 Claims. (Cl. 226—44)

This invention comprises improvements in or relating to filling and stuffing machines for mattresses and the like, and is concerned with apparatus of the kind comprising a table fitted with a movable member or so-called plunger which is adapted to be operated to push or pass filling or like material from the table into a tick or casing applied to a nozzle device at the forward end of the table.

The term mattress in this specification and the claims appended to it is to be understood to cover other articles of a like kind to mattresses.

The object of the invention is improved constructions of the machine adapted to provide for more satisfactory and uniform filling of mattresses, cushions, upholstered and other goods and to simplify the operations involved.

According to the invention, the movable member or plunger of the table is fitted with a plate or base adapted to be advanced and retracted therewith and to receive the filling or stuffing material. The latter is thus advanced with the plate or base into the tick or casing and when the feeding operation is complete and the plunger retracted in the usual way the plate or base is withdrawn leaving the filling in position in the mattress or the like. Provision may be made for adjusting the width of the plate in common with the normal adjustment of the plunger, table and nozzle, so as to suit mattresses of different widths. It is convenient to divide the table into two parts longitudinally and to form the plunger plate in overlapping parts. The table has the usual upstanding sides to constitute a trough to enable it to contain the filling material or the plunger plate only may be provided with upstanding sides. Further facilitation of the filling operation is possible by providing a short travelling conveyor or endless belt at the forward end of and above the table so as to act upon the upper surface of the layer of filling material.

According to another modification the plunger may be associated with a second plate to cover the filling material, both plates passing into the tick, with the filling material therebetween, on the forward operation of the plunger and both plates being withdrawn together on the retraction of the plunger, leaving the filling material behind in the mattress. If desired, a gate may be provided to close the front of the table while being packed with the filling or stuffing material and when filling commences the gate is removed.

In order to enable the invention to be readily understood reference is directed to the accompanying drawing illustrating in more or less diagrammatic manner, suitable examples of construction for carrying out these improvements and in which:—

Fig. 1 is a central longitudinal section of one form of machine,

Fig. 2 is a plan view of Fig. 1, and

Fig. 3 is a view similar to Fig. 1 of a modification.

In Figs. 1 and 2, the machine comprises a table $a$ mounted on any suitable or known underframe $b$ and a plunger device $c$, $c^1$, $c^2$ adapted to be moved along the table in the usual fashion by means of a threaded shaft $d$. The table has the known upstanding sides $e$ and a longitudinal slot $f$ running throughout its length above the screw $d$ which is preferably in the middle of the table in plan. The table is divided into two parts with the central part slotted in known manner. The plunger is arranged in the trough of the table, extending across the complete width thereof between the sides $e$, and it is connected by a yoke member $g$ comprising part $g'$, extended downwardly through the slot $f$, to a nut $h$ on the threaded shaft $d$. A filling nozzle $k$ is provided at the front end of the table and a tick or casing is placed over this, preferably in collapsed condition in the usual way, as seen at $l$. The plunger comprises telescoping portions $c$, $c^1$, $c^2$, to suit mattresses of different widths and the table with the filling nozzle may be made adjustable in width by suitable means such as screw shafts $m$, $n$, which are connected by sprocket chain $o$ and operated by a common handle $p$. Slots $r$ are provided in the central plunger part $c$ for the telescoping of the outer parts $c^1$, $c^2$ and the plunger table and nozzle are seen in Fig. 2 in their position of full inward adjustment. The plunger is shown provided with a plate $s$, $s^1$, $s^2$ extending forwardly along the surface of the table and so arranged that it will pass into and through the nozzle $k$. The plate comprises the overlapping longitudinal sections $s$, $s^1$, $s^2$ to correspond with the divisions of the plunger, so as to allow the width of the plate to vary with the plunger to suit the width of the mattress tick to be filled. The nozzle $k$, in addition to being divided longitudinally, may also be divided into upper and lower parts of which the upper part may be adjustable vertically to suit mattresses of different thicknesses. The vertical adjustment of this upper part may be by means of screws and slots such as $t$, $u$ respectively or other suitable provision; the table $a$ having a frame part $v$ to provide for this adjustable mounting. The construction of the apparatus is suitably such that the lateral adjustment of the parts $c^1$, $c^2$, $s^1$, $s^2$ of the plunger and its plate may be effected through the screws $m$ and $n$; for example, the outer plate parts $s^1$, $s^2$ may have engagement with longitudinal slots in the respective parts of the table $a$.

In operation, the plunger is retracted to the rear end of the table and filling or stuffing material $w$ then packed to suitable depth on the plate or base $s$, $s^1$, $s^2$ as shown. The screw shaft $d$ is then operated to advance the plunger forwardly to carry the filling material into the tick or casing $l$. In this operation, the plate $s$, $s^1$, $s^2$ passes into and through the nozzle $k$ carrying the filling material with it into the tick which becomes extended to its full length by the plate. This completed, the plunger is retracted to its initial position taking the plate or base with it and leaving the filling or stuffing compactly disposed in the tick $l$. Thus a very satisfactory and uniform filling of the mattress is achieved while the operations involved are quite simple because the plate or base is retracted with the plunger and does not need to be operated separately.

If desired, a short travelling conveyor or endless belt such as is shown diagrammatically at $x$ in Fig. 1 may be provided to assist in passing the filling material into the tick or casing $l$. This conveyor is of sufficient width to extend across the table when the sides of the latter are at their greatest distance apart and the sides of the table are cut away to pass under it. It may also be made adjustable in height and length and is suitably made adjustable in inclination about the axis $y$, for example by supporting its free end upon stops such as $y^2$, Figure 1, which may be adjustably clamped in slots $y^3$ of table-frame parts $y^4$. Being placed above the forward end of the table, this conveyor acts on the upper surface of the layer of filling material $w$ and may be adapted to effect very even filling of the mattress.

A gate of known form may be provided at the front end of the table to retain the filling material while it is packed on to the table and such gate is removed when the filling operation commences. Or the gate may be carried on the lower end of the conveyor $x$ as shown at $y'$ so that when the filling material is fed to the table and the conveyor is raised about the axis $y$ against stops $y^5$ the gate closes the end of the table and when the conveyor is lowered to its operative position the gate is automatically raised to a horizontal position.

The modification shown by Fig. 3 differs from Figs. 1 and 2 by the provision of a second plate $y^2$ at the top of the filling material $w$. This plate is suitably carried on the plunger, marked $c$, as by hinging it thereto as at $z$, and it passes into the tick or casing $l$ along with the filling material and the bottom plate marked $s$. Said plate is counterbalanced to maintain its horizontal position. When the plunger is retracted the two plates are withdrawn with it, leaving the material in the mattress. $c^4$ is a false plunger which is free from and positioned in front of the plunger $c$ so that when the latter has moved forward into the nozzle and is withdrawn the said false plunger remains in the nozzle to retain the filling material in the mattress. To assist this spring clips, such as $c^5$, with bent ends may be provided on the nozzle or the false plunger to co-operate with recesses, such as $c^6$, in the ends of the false plunger or in the side walls of the nozzle respectively. When the plunger is withdrawn and the false plunger placed in position the machine is ready for a further filling operation, the plate $y^2$ being hinged upwardly to allow insertion of a fresh layer of filling or stuffing material and then being lowered again as will be readily understood.

A vertically or horizontally withdrawable or hinged gate may be provided at the forward end of the table to facilitate even layering of the filling material $w$. The gate would be removed at the beginning of the filling operation immediately after the formation of the filling layer $w$.

What we claim is:—

1. A machine for filling mattresses, comprising a table, a nozzle at the forward end of the table of adjustable dimensions to receive mattress cases of different sizes, a plunger slidable along the table and composed of relatively adjustable parts so that its width may be varied, a plate-like base fitted to and extending forward of the plunger to receive filling material and comprising sections corresponding with the adjustable parts of the plunger, mechanical means for adjusting the parts of the plunger and base, and mechanical means operative on said plunger to project said base through the nozzle and withdraw same on completion of a filling operation.

2. A machine for filling mattresses, comprising a table, a nozzle at the forward end of the table of adjustable dimensions to receive mattress cases of different sizes, a plunger slidable along the table and composed of relatively adjustable parts so that its width may be varied, a plate-like base fitted to and extending forward of the plunger to receive filling material and comprising sections corresponding with the adjustable parts of the plunger, mechanical means for adjusting the parts of the plunger and base, mechanical means operative on said plunger to project said base through the nozzle and withdraw same on completion of a filling operation, and an endless belt device operative in conjunction with the plunger and base to pass filling material through the nozzle.

3. In a mattress filling machine, a combination of plunger, plate-like base fitted to and extending forward of the plunger, means for reciprocating the plunger and base, and an endless-belt device co-operative with the plunger and base and of adjustable inclination.

4. In a mattress filling machine, a combination of plunger, plate-like base fitted to and extending forward of the plunger, means for reciprocating the plunger and base and an endless-belt device co-operative with the plunger and base in one position and movable out of that position to permit filling of material on to the base.

5. In a mattress filling machine in accordance with claim 4, a gate fitted to the endless-belt device to close the end of the table when the belt device is moved out of its operative position and which opens the end of the table when the belt device is moved into operative position.

6. In a mattress filling machine the combination of a filling nozzle, a plunger, a plate-like base fitted to and extending forward of the plunger, a cover plate fitted to the plunger, and a false plunger free from the first-mentioned plunger and co-operative with the filling nozzle to retain filling material in the mattress substantially as set forth.

WALTER PAUL FREDERICK FANGHANEL.
ALFRED SYDNEY GEORGE ROLSTONE.